(No Model.)
J. F. WELCH.
PULLEY FOR VARIABLE SPEED.
No. 377,281. Patented Jan. 31, 1888.
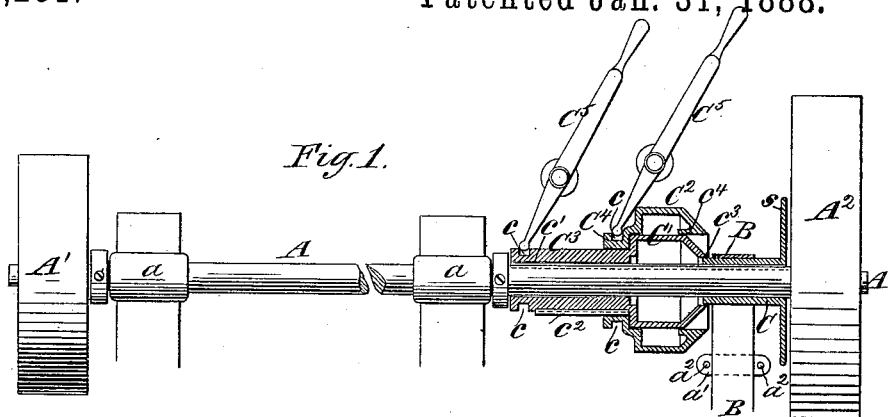
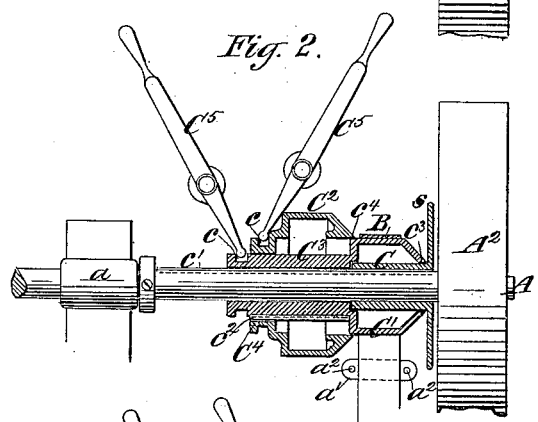
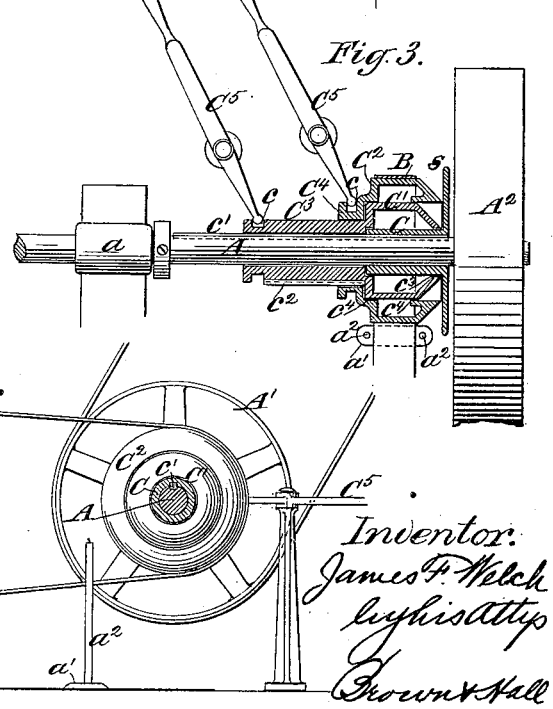
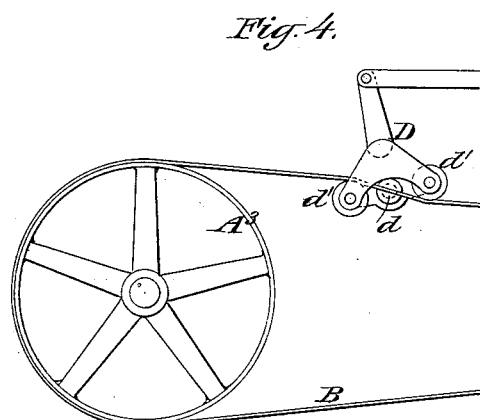
Witnesses: Emil Hertu, C. Sundgren.
Inventor: James F. Welch by his Atty Brown & Hall

UNITED STATES PATENT OFFICE.

JAMES F. WELCH, OF BROOKLYN, ASSIGNOR TO THE GLEN COVE MACHINE COMPANY, (LIMITED,) OF GREEN POINT, NEW YORK.

PULLEY FOR VARIABLE SPEED.

SPECIFICATION forming part of Letters Patent No. 377,281, dated January 31, 1888.

Application filed September 15, 1887. Serial No. 249,733. (No model.)

*To all whom it may concern:*

Be it known that I, JAMES F. WELCH, of Brooklyn, (Green Point,) in the county of Kings and State of New York, have invented a new and useful Improvement in Pulleys for Variable Speeds, of which the following is a specification.

My invention more particularly relates to pulleys which are employed in connection with wood-planing machines, but may be employed in pulleys for other machines or apparatus.

For varying the speed imparted by a driving-belt it is usual to employ, in connection with such belt, cone-pulleys having steps of different sizes, which necessitate the lateral shifting of the belt to vary from one speed to another; and the object of my invention is to provide pulleys of a construction which will afford provision for varying from one speed to another without lateral shifting of the belt and by a lateral shifting of the pulleys.

To this end the invention consists in the combination, with a shaft, of a series of pulleys of different diameters sliding one over another to form a nest of pulleys, all being connected together and with the shaft, so as to turn with the shaft, the said pulleys having inclined edges, and also having concentric sleeves by which they may be shifted, and stops for engaging a belt and holding it in one plane during the lateral shifting of the pulleys.

In the accompanying drawings, Figure 1 is a partly-sectional plan of a shaft, pulleys, and a driving-belt embodying my invention. Fig. 2 is a similar view illustrating a different position of the pulleys, and Fig. 3 is also a similar view illustrating still another different position. Fig. 4 is a side view illustrating the belt, together with my improved pulleys, from which it drives, and a belt-tightener employed in connection therewith.

Similar letters of reference designate corresponding parts in all the figures.

The shaft upon which my improved pulleys are arranged may be a counter-shaft for driving any machine, or it may be a counter-shaft for a wood-planing machine, which is commonly arranged at the feeding end thereof and constitutes the driving-shaft for other parts of the machine.

In the accompanying drawings, A designates the shaft, which is journaled in bearings $a$, and upon which are pulleys $A'$ $A^2$, from which motion is received and transmitted. This shaft is rotated by a belt, (not here shown,) and upon it are pulleys from which motion is transmitted to a pulley $A^3$.

According to my invention, and in order that the shaft may transmit a variable speed by the belt B, I employ a nest of pulleys which, when bunched together, are in the same plane with the belt B. As here shown, three pulleys, C $C'$ $C^2$, are employed, and the two which are fitted outside the inner one are cup-shaped, so as to shut readily over the inner one and one over the other. The inner pulley, C, is fast upon the shaft A; but the others, $C'$ $C^2$, are adapted to slide upon the shaft, and yet are locked to the shaft and to each other, so as to turn with the shaft. The pulleys $C'$ $C^2$ are provided with concentric sleeves $C^3$ $C^4$, which fit the first upon the shaft A and the second upon the sleeve $C^3$, and through these sleeves the pulleys $C'$ $C^2$ may be slid lengthwise of the shaft by means of levers $C^5$, which engage annular grooves $c$ in the said sleeves. The sleeve $C^3$ engages a feather or spline, $c'$, in the shaft A, and the sleeve $C^3$ engages a corresponding feather or spline, $c^2$, in the sleeve $C^3$, and consequently it will be seen that notwithstanding the movement of the pulleys $C'$ $C^2$ lengthwise of the shaft A, they will still rotate in unison. It will of course be understood that inasmuch as the belt B drives from pulleys of different sizes said belt should be somewhat slack, and I therefore employ a tightening device for the belt, which may be, for example, like that shown in Fig. 4. That device consists of a lever, D, which is fulcrumed at $d$, and which carries tightening-pulleys $d'$, bearing one against the upper side and the other against the lower side of the belt, and this tightening device may be shifted by hand, so as to proportion the tension of the belt to the pulley from which it is at that time driving.

In Fig. 1 I have represented the belt B as driving from the smaller pulley, C, of the nest or series, the two pulleys $C'$ $C^2$ being shifted laterally out of the way; but in Fig. 2 I have represented the belt B as driving from the middle pulley, C', of the series, which is shifted laterally to cover the pulley C, and has therefore been shifted from under cover of the pulley $C^2$. In Fig. 3 I have represented the pulleys as all nested together or brought into position covering one another, and the belt B as driving from the outermost pulley, $C^2$, and therefore transmitting from the shaft A the greatest possible speed.

It is of course obvious that inasmuch as the pulleys are shifted laterally inside of the belt some means must be employed for holding the belt in a single plane and against shifting. I have here shown pins $a^2$, which project from a base piece or plate, $a'$, and which constitute a fork embracing the belt B, and these pins therefore form stops for preventing the lateral shifting of the belt in either direction.

It will be observed that the edges of the pulleys C' $C^2$ are inclined, and hence when slid lengthwise of the shaft A they will readily slide under the belt B, and should they have any tendency to move the belt sidewise it will be resisted by the flange $s$ on the pulley C, as well as by the stops $a^2$.

The pulleys C' $C^2$ may be cored for sake of lightness, and the pulley C' preferably has a bearing, $c^3$, on the pulley C when slid back, while the pulley $C^2$, when slid back or when slid forward, has a bearing, $c^4$, on the pulley C'.

I am aware that prior to my invention it has been proposed to combine with a pulley sliding upon a driving-shaft a cylindric belt-supporting surface fast upon one of the hangers of said shaft, the pulley being hollow, so that it might be slid over or away from the belt-supporting surface. Such an apparatus is not included in my claim and is not designed for transmitting different speeds, it being simply intended that the transmission of power from said shaft shall be stopped by slipping the pulley outward from the belt, leaving the belt supported on the fixed cylindric surface, and that the transmission of power from said shaft shall be commenced again by slipping the pulley over the fixed cylindric surface and within the belt.

I am also aware that it has been proposed to combine with a fixed pulley upon a driven shaft a loose pulley adapted to slide into the fixed pulley, and also belt-shifting devices whereby, when the loose pulley is slid within the fixed pulley, the belt is forced upon the fixed pulley to transmit motion to the shaft, while when the loose pulley is withdrawn from the fixed pulley the belt is shifted by the act of withdrawal from the fixed to the loose pulley. I do not include in my invention such an apparatus as this.

What I claim as my invention, and desire to secure by Letters Patent, is—

The combination, with a shaft, of a series of pulleys of different diameters sliding one over another to form a nest of pulleys, all being connected together and with the shaft, so as to turn with the shaft, the said pulleys having inclined edges, and also having concentric sleeves by which they may be shifted, and stops for engaging the belt and holding it in one plane during the lateral shifting of the pulleys, substantially as and for the purpose herein described.

JAMES F. WELCH.

Witnesses:
C. HALL,
A. B. HUTCHINSON.